(12) United States Patent
Shargots et al.

(10) Patent No.: US 9,558,855 B2
(45) Date of Patent: Jan. 31, 2017

(54) PRESSURIZED WATER REACTOR WITH UPPER PLENUM INCLUDING CROSS-FLOW BLOCKING WEIR

(75) Inventors: Scott J. Shargots, Forest, VA (US); Matthew W. Ales, Issaquah, WA (US); Michael J. Edwards, Forest, VA (US); Andrew C. Whitten, Lynchburg, VA (US); Yuanming R. Li, Kitchener (CA); Jeffrey C. Millman, Ayr (CA); Roy McGillvray, Mississauga (CA)

(73) Assignees: BWXT Nuclear Energy, Inc., Charlotte, NC (US); BWXT Canada Ltd., Cambridge, Ontario ( * ) Notice: Subject to any disclaimer, the term of this patent is extended or adjusted under 35 U.S.C. 154(b) by 825 days.

(21) Appl. No.: 13/293,899

(22) Filed: Nov. 10, 2011

(65) Prior Publication Data
US 2013/0121453 A1 May 16, 2013

(51) Int. Cl.
*G21C 15/18* (2006.01)
*G21C 15/243* (2006.01)
(Continued)

(52) U.S. Cl.
CPC .............. *G21C 15/18* (2013.01); *F04D 3/005* (2013.01); *F04D 7/08* (2013.01); *F04D 29/548* (2013.01);
(Continued)

(58) Field of Classification Search
CPC ......... G21C 15/02; G21C 15/00; G21C 15/25; G21C 15/16; G21C 15/182
(Continued)

(56) References Cited

U.S. PATENT DOCUMENTS

| | | |
|---|---|---|
| 3,305,450 A | 2/1967 | Maldague |
| 3,312,595 A | 4/1967 | Hackney |
| (Continued) | | |

FOREIGN PATENT DOCUMENTS

| | | |
|---|---|---|
| CN | 85101411 A | 1/1987 |
| DE | 3533016 A1 | 3/1987 |
| (Continued) | | |

OTHER PUBLICATIONS

The Iris Spool-Type Reactor Coolant Pump, J. M. Kujawski, et al., Proceedings of ICONE10, 10th International Conference on Nuclear Engineering, Arlington, VA, Apr. 14-18, 2002.
(Continued)

*Primary Examiner* — Jack W Keith
*Assistant Examiner* — Lily C Garner
(74) *Attorney, Agent, or Firm* — Nelson Mullins Riley & Scarborough, LLP

(57) ABSTRACT

A pressurized water reactor (PWR) comprises: a nuclear core comprising a fissile material; a cylindrical pressure vessel having a vertically oriented cylinder axis and containing the nuclear core immersed in primary coolant water; and a hollow cylindrical central riser disposed concentrically with and inside the cylindrical pressure vessel. A downcomer annulus is defined between the hollow cylindrical central riser and the cylindrical pressure vessel. The hollow cylindrical central riser has a radially expanding upper orifice that merges into an annular divider plate that separates an upper plenum above the annular divider plate from a lower plenum below the annular divider plate. The upper plenum is in fluid communication with the radially expanding upper orifice and the lower plenum is in fluid communication with the downcomer annulus. A weir may extend away from a bottom wall of the lower plenum into the lower plenum. An emergency core cooling system (ECCS) return
(Continued)

line nozzle may be arranged to inject water into the upper plenum. A pump support plate spans the inner diameter of the cylindrical pressure vessel and forms a portion of the pressure boundary of the cylindrical pressure vessel, and reactor coolant pumps (RCPs) are supported by the pump support plate. Alternatively, reactor coolant pumps (RCPs) are supported by an arcuate annular ledge formed in the upper portion of the cylindrical pressure vessel.

35 Claims, 9 Drawing Sheets

(51) Int. Cl.
G21C 1/08 (2006.01)
G21C 1/32 (2006.01)
F04D 7/08 (2006.01)
F04D 3/00 (2006.01)
F04D 29/54 (2006.01)
F04D 29/60 (2006.01)
G21C 15/00 (2006.01)
G21C 13/02 (2006.01)

(52) U.S. Cl.
CPC .............. F04D 29/605 (2013.01); G21C 1/086 (2013.01); G21C 1/322 (2013.01); G21C 15/243 (2013.01); G21C 13/02 (2013.01); G21C 15/00 (2013.01); Y02E 30/32 (2013.01)

(58) Field of Classification Search
USPC ................................ 376/282, 361, 395, 399
See application file for complete search history.

(56) References Cited

U.S. PATENT DOCUMENTS

| | | |
|---|---|---|
| 3,385,760 A | 5/1968 | Hawkins |
| 3,915,123 A | 10/1975 | Reisacher |
| 3,988,202 A | 10/1976 | Costes |
| 4,039,377 A | 8/1977 | Andrieu et al. |
| 4,057,467 A | 11/1977 | Kostrzewa |
| 4,072,563 A | 2/1978 | McDonald et al. |
| 4,094,737 A | 6/1978 | Greischel et al. |
| 4,191,246 A * | 3/1980 | Cassell .................... 165/134.1 |
| 4,213,824 A | 7/1980 | Jabsen |
| 4,246,069 A | 1/1981 | Dupuy et al. |
| 4,298,088 A * | 11/1981 | Keller ........................ 181/211 |
| 4,322,233 A | 3/1982 | Sisk |
| 4,396,350 A | 8/1983 | Kinney et al. |
| 4,859,401 A | 8/1989 | Murase et al. |
| 4,897,240 A | 1/1990 | Sako |
| 5,053,190 A | 10/1991 | Gardner et al. |
| 5,089,218 A | 2/1992 | Gardner et al. |
| 5,465,280 A | 11/1995 | Wedellsborg |
| 5,491,731 A | 2/1996 | Corpora et al. |
| 5,563,927 A | 10/1996 | Siegel et al. |
| 5,583,900 A | 12/1996 | Kasahara et al. |
| 5,715,288 A | 2/1998 | Matteson |
| 5,789,720 A | 8/1998 | LaGally et al. |
| 5,920,603 A * | 7/1999 | Matsumoto et al. ......... 376/362 |
| 5,935,439 A | 8/1999 | Hart et al. |
| 6,091,791 A | 7/2000 | Matsumoto et al. |
| 6,130,927 A | 10/2000 | Kang et al. |
| 6,259,760 B1 | 7/2001 | Carelli et al. |
| 6,275,557 B2 | 8/2001 | Nylund et al. |
| 6,546,066 B2 | 4/2003 | Baliga et al. |
| 6,618,460 B2 | 9/2003 | Baliga et al. |
| 6,636,578 B1 | 10/2003 | Clark |
| 6,636,580 B2 | 10/2003 | Murakami et al. |
| 6,769,252 B2 | 8/2004 | Smith |
| 6,813,328 B2 | 11/2004 | Kitch et al. |
| 6,819,733 B2 | 11/2004 | Hatfield et al. |
| 6,865,242 B2 | 3/2005 | Barbe et al. |
| 6,888,908 B1 | 5/2005 | Klarner et al. |
| 6,895,068 B2 | 5/2005 | Hartel et al. |
| 6,909,765 B2 | 6/2005 | Lahoda |
| 7,085,340 B2 | 8/2006 | Goldenfield et al. |
| 7,139,359 B2 | 11/2006 | Baliga et al. |
| 7,154,982 B2 | 12/2006 | Gautier et al. |
| 7,257,185 B1 | 8/2007 | Yamada et al. |
| 7,389,669 B2 | 6/2008 | Badlani et al. |
| 7,453,972 B2 | 11/2008 | Hellandbrand, Jr. et al. |
| 7,561,654 B2 | 7/2009 | Makovicka et al. |
| 7,567,645 B2 | 7/2009 | Baliga |
| 7,668,280 B2 | 2/2010 | Hellandbrand, Jr. et al. |
| 7,668,284 B2 | 2/2010 | Sparrow et al. |
| 7,929,657 B2 | 4/2011 | Muller et al. |
| 2004/0017877 A1 | 1/2004 | Hartel et al. |
| 2004/0096026 A1 | 5/2004 | Choe et al. |
| 2004/0136488 A1 | 7/2004 | Tuite et al. |
| 2005/0117684 A1 | 6/2005 | Klarner et al. |
| 2005/0190877 A1 | 9/2005 | Knapp |
| 2005/0199591 A1 | 9/2005 | Coe et al. |
| 2007/0274429 A1 | 11/2007 | Mathieu et al. |
| 2010/0316181 A1* | 12/2010 | Thome et al. ................ 376/372 |

FOREIGN PATENT DOCUMENTS

| | | |
|---|---|---|
| EP | 0164525 A1 | 12/1985 |
| GB | 2237441 A | 5/1991 |
| JP | H0643275 A | 2/1994 |
| WO | 2010/059640 A2 | 5/2010 |
| WO | WO 2010059640 A2 * | 5/2010 |
| WO | 2012/158949 A1 | 11/2012 |

OTHER PUBLICATIONS

Office Action dated Mar. 15, 2016 for EP Application No. 12859050.2.
Chinese Office Action dated Feb. 26, 2016 for Chinese Application No. 201210448079.5.
International Search Report and Written Opinion for PCT/US2012/057791 dated Jun. 10, 2013.
European Search Report for EP Application No. 12859050.2 dated Apr. 17, 2015.

* cited by examiner

PRESSURIZED WATER REACTOR WITH UPPER PLENUM INCLUDING CROSS-FLOW BLOCKING WEIR

BACKGROUND

The following relates to the nuclear reactor arts, nuclear power generation arts, nuclear reactor hydrodynamic design arts, and related arts.

In nuclear reactor designs of the pressurized water reactor (integral PWR) type, a radioactive nuclear reactor core is immersed in primary coolant water at or near the bottom of a pressure vessel. In a typical design, the primary coolant is maintained in a compressed or subcooled liquid phase in a cylindrical pressure vessel that is mounted generally upright (that is, with its cylinder axis oriented vertically). A hollow cylindrical central riser is disposed concentrically inside the pressure vessel. Primary coolant flows upward through the reactor core where it is heated and rises through the central riser, discharges from the top of the central riser and reverses direction to flow downward back toward the reactor core through a downcomer annulus defined between the pressure vessel and the central riser. This is a natural convection flow circuit that can, in principle, be driven by heat injection from the reactor core and cooling of the primary coolant as it flows upward and away from the reactor core. However, in some reactor designs this natural convection is augmented or supplanted with motive force provided by electromechanical reactor coolant pumps.

To extract power from the PWR the primary coolant is flowed through a steam generator. In some designs the steam generator is external to the pressure vessel and primary coolant is fed to the steam generator through large diameter piping. In so-called "integral" PWR designs the steam generator is disposed inside the pressure vessel, typically in the downcomer annulus, and secondary coolant is flowed through the steam generator. The integral PWR design has substantial safety advantages over non-integral designs insofar as the large diameter piping carrying radioactive primary coolant to the external pressure vessel is replaced by smaller diameter piping feeding non-radioactive secondary coolant (i.e., feedwater) into the internal steam generator and extracting non-radioactive steam from the steam generator.

Some integral PWR designs conforming with the above are described in Thome et al., "Integral Helical Coil Pressurized Water Nuclear Reactor", U.S. Pub. No. 2010/0316181 A1 published Dec. 16, 2010 which is incorporated herein by reference in its entirety. U.S. Pub. No. 2010/0316181 A1 describes integral steam generators employing helical steam generator tube geometry; however, other geometries such as vertical tube designs are also known. In various steam generator designs, the primary coolant may flow inside the steam generator tubes and the secondary coolant outside the steam generator tubes, or vice versa.

Operational efficiency of such PWR systems is affected in part by the efficacy with which the upward primary coolant water flow in the central riser is reversed and transferred into downward primary coolant flow through the downcomer annulus (e.g., through a steam generator disposed in the downcomer annulus for steam generation). This flow reversal can introduce substantial flow resistance into the overall primary coolant flow circuit. Moreover, even radial and circumferential distribution of the primary coolant flow into the downcomer annulus facilitates temperature uniformity in the downcomer annulus and in the annular steam generator located therein. Various approaches have been employed for providing even radial and circumferential distribution with low flow resistance. For example, illustrative central riser of the illustrative PWR of U.S. Pub. No. 2010/0316181 A1 has an upper end that includes small openings, or a screen, that facilitates diffusion and lateral flow of primary coolant water exiting the upper orifice of the central riser. Kitch et al., U.S. Pat. No. 6,813,328 discloses another approach in which an entirely internal reactor coolant pump (RCP) submerged in the primary coolant has its discharge connected directly with the inlet of a steam generator so as to drive primary coolant exiting the upper orifice of the central riser downward into the steam generator.

Disclosed herein are improvements that provide various benefits that will become apparent to the skilled artisan upon reading the following.

BRIEF SUMMARY

In one aspect of the disclosure, a pressurized water reactor (PWR) comprises: a nuclear core comprising a fissile material; a cylindrical pressure vessel having a vertically oriented cylinder axis and containing the nuclear core immersed in primary coolant water; and a hollow cylindrical central riser disposed concentrically with and inside the cylindrical pressure vessel. A downcomer annulus is defined between the hollow cylindrical central riser and the cylindrical pressure vessel. The hollow cylindrical central riser has a radially expanding upper orifice that merges into an annular divider plate that separates an upper plenum above the annular divider plate from a lower plenum below the annular divider plate. The upper plenum is in fluid communication with the radially expanding upper orifice and the lower plenum is in fluid communication with the downcomer annulus.

In another aspect of the disclosure, an apparatus comprises: a hollow cylindrical central riser sized to be disposed concentrically inside a cylindrical pressure vessel of a pressurized water reactor; and an annular divider plate sized to separate an upper plenum of the cylindrical pressure vessel from a lower plenum of the cylindrical pressure vessel; wherein the hollow cylindrical central riser includes a radially expanding upper orifice that merges into the annular divider plate.

In another aspect of the disclosure, a pressurized water reactor (PWR) comprises: a nuclear core comprising a fissile material; a cylindrical pressure vessel having a vertically oriented cylinder axis and containing the nuclear core immersed in primary coolant water; a hollow cylindrical central riser disposed concentrically with and inside the cylindrical pressure vessel, a downcomer annulus being defined between the hollow cylindrical central riser and the cylindrical pressure vessel; and an annular divider plate separating an upper plenum above the annular divider plate from a lower plenum below the annular divider plate. The upper plenum is in fluid communication with the upper orifice of the hollow cylindrical riser and the lower plenum is in fluid communication with the downcomer annulus. A flow path from the upper plenum to the lower plenum is disposed outboard of the downcomer annulus. In some embodiments the lower plenum is defined in part by a bottom wall that extends radially outboard from an upper end of the downcomer annulus, and a weir extends away from the bottom wall into the lower plenum.

In another aspect of the disclosure, an apparatus comprises a pressurized water reactor (PWR) and reactor coolant pumps (RCPs). The PWR includes: a nuclear core comprising a fissile material; a cylindrical pressure vessel having a vertically oriented cylinder axis and containing the nuclear core immersed in primary coolant water; a hollow cylindrical central riser disposed concentrically with and inside the cylindrical pressure vessel, a downcomer annulus being defined between the hollow cylindrical central riser and the cylindrical pressure vessel; and a pump support plate spanning the inner diameter of the cylindrical pressure vessel wherein a portion of the pump support plate forms a portion of the pressure boundary of the cylindrical pressure vessel. The RCPs are supported by the portion of the pump support plate that forms a portion of the pressure boundary of the cylindrical pressure vessel. The RCPs are arranged to pump primary coolant water discharged from an upper orifice of the hollow cylindrical central riser into the downcomer annulus.

In another aspect of the disclosure, an apparatus comprises a pressurized water reactor (PWR) and an emergency core cooling system (ECCS) return line nozzle. The PWR includes: a nuclear core comprising a fissile material; a cylindrical pressure vessel having a vertically oriented cylinder axis and containing the nuclear core immersed in primary coolant water; a hollow cylindrical central riser disposed concentrically with and inside the cylindrical pressure vessel, a downcomer annulus being defined between the hollow cylindrical central riser and the cylindrical pressure vessel, and an annular divider plate separating an upper plenum above the annular divider plate from a lower plenum below the annular divider plate. The ECCS return line nozzle is arranged to inject water into the upper plenum.

In another aspect of the disclosure, an apparatus comprises a pressurized water reactor (PWR) and reactor coolant pumps (RCPs). The PWR includes: a nuclear core comprising a fissile material; a cylindrical pressure vessel having a vertically oriented cylinder axis and containing the nuclear core immersed in primary coolant water wherein an upper portion of the cylindrical pressure vessel defines an internal pressurizer volume and an arcuate annular ledge is formed in the upper portion of the cylindrical pressure vessel; and a hollow cylindrical central riser disposed concentrically with and inside the cylindrical pressure vessel. A downcomer annulus is defined between the hollow cylindrical central riser and the cylindrical pressure vessel. The RCPs are supported by the arcuate annular ledge formed in the upper portion of the cylindrical pressure vessel. The RCPs are arranged to pump primary coolant water discharged from an upper orifice of the hollow cylindrical central riser into the downcomer annulus.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

In FIG. 3 the reactor coolant pumps (RCPs) are omitted to reveal the mounting openings.

FIG. 5 shows an enlarged view of a portion of FIG. 4.

DETAILED DESCRIPTION OF THE PREFERRED EMBODIMENTS

Figure 1:
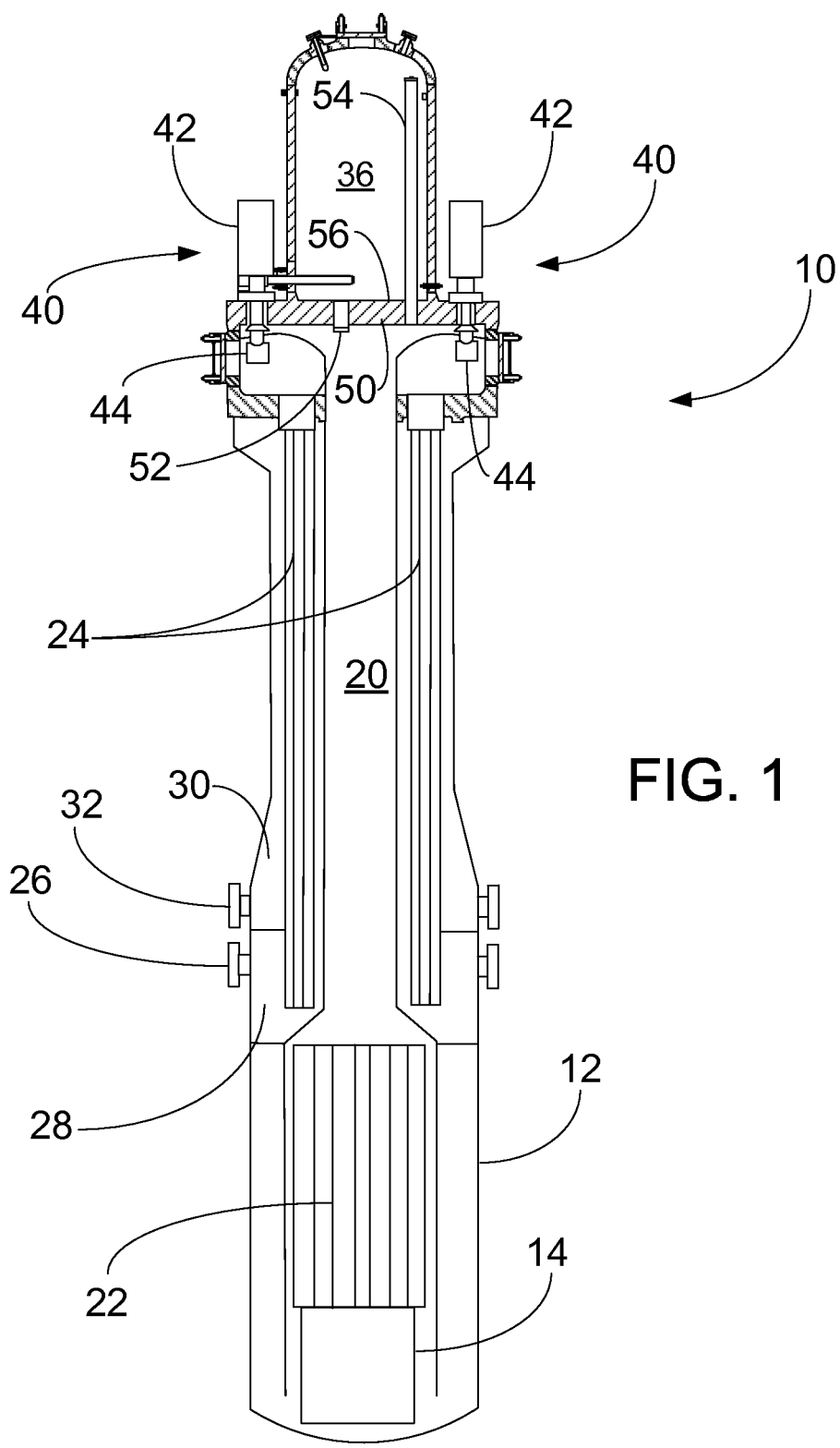
FIG. 1 diagrammatically shows a nuclear reactor as disclosed herein.

With reference to FIG. 1, an illustrative nuclear reactor of the integral pressurized water reactor (integral PWR) type 10 includes a pressure vessel 12, which in the illustrative embodiment is a vertically mounted cylindrical pressure vessel. As used herein, the phrase "cylindrical pressure vessel" or similar phraseology indicates that the pressure vessel has a generally cylindrical shape, but may in some embodiments deviate from a mathematically perfect cylinder. For example, the illustrative cylindrical pressure vessel 12 has a circular cross-section of varying diameter along the length of the cylinder, and has rounded ends, and includes various vessel penetrations, vessel section flange connections, and so forth. Similarly, although the pressure vessel 12 is upright, that is, vertically oriented, it is contemplated for the vertically oriented cylinder axis of the cylindrical pressure vessel to deviate from being precisely vertical respective to gravity. For example, if the PWR is disposed in a maritime vessel then the cylinder axis of the vertically oriented cylindrical pressure vessel may have some tilt, which may vary with time, due to movement of the maritime vessel on or beneath the water.

FIG. 1 shows the integral PWR 10 in side sectional view to reveal selected diagrammatically shown internal components. A nuclear reactor core 14 is disposed in a lower portion of the pressure vessel 12. The reactor core 14 includes a mass of fissile material, such as a material containing uranium oxide ($UO_2$) that is enriched in the fissile $^{235}U$ isotope, in a suitable matrix material. In a typical configuration, the fissile material is arranged as "fuel rods" arranged in a core basket. The pressure vessel 12 contains primary coolant water (typically light water, that is, $H_2O$, although heavy water, that is, $D_2O$, is also contemplated) in a subcooled state.

A hollow cylindrical central riser 20 comprises a hollow cylindrical element disposed coaxially inside the cylindrical pressure vessel 12. (Again, the term "cylindrical" is intended to encompass generally cylindrical risers that deviate from a perfect cylinder by variations in diameter along the cylinder axis, inclusion of selected openings, or so forth). Primary coolant water heated by the operating nuclear reactor core 14 rises upward through the central riser 20 toward the top of the pressure vessel, where it discharges, reverses flow direction and flows downward toward the core 14 through an outer annulus, known in the art as the downcomer annulus, which is defined between the central riser 20 and the inner cylindrical wall of the pressure vessel 12.

A control rods system 22 is mounted above the reactor core 14 and includes control rod drive mechanism (CRDM) units and control rod guide structures configured to precisely and controllably insert or withdraw control rods into or out of the reactor core 14. The illustrative control rods system 22 employs internal CRDM units that are disposed inside the pressure vessel 12. Some illustrative examples of suitable internal CRDM designs include: Stambaugh et al., "Control Rod Drive Mechanism for Nuclear Reactor", U.S. Pub. No.

2010/0316177 A1 published Dec. 16, 2010 which is incorporated herein by reference in its entirety; and Stambaugh et al., "Control Rod Drive Mechanism for Nuclear Reactor", Int'l Pub. WO 2010/144563 A1 published Dec. 16, 2010 which is incorporated herein by reference in its entirety. In general, the control rods contain neutron absorbing material, and reactivity is increased by withdrawing the control rods or decreased by inserting the control rods. So-called "gray" control rods are continuously adjustable to provide incremental adjustments of the reactivity. So-called "shutdown" control rods are designed to be inserted as quickly as feasible into the reactor core to shut down the nuclear reaction in the event of an emergency. Various hybrid control rod designs are also known. For example, a gray rod may include a mechanism for releasing the control rod in an emergency so that it falls into the reactor core 14 thus implementing a shutdown rod functionality.

The PWR 10 is an integral PWR that includes an internal steam generator 24 disposed in the downcomer annulus defined between the central riser 20 and the inside wall of the pressure vessel 12. The steam generator 24 provides independent but proximate flow paths for downwardly flowing primary coolant and upwardly flowing secondary coolant. The secondary coolant enters at a feedwater inlet 26 into an annular feedwater plenum 28, flows into the bottom of the steam generator 24 and upward through the steam generator 24 where it is heated by the proximate downwardly flowing primary coolant to be converted to steam. The steam enters an annular steam plenum 30 where it flows generally downward to discharge at a steam outlet 32.

FIG. 1 does not illustrate the detailed structure of the steam generator 24 and the primary and secondary coolant paths. Typically, the steam generator 24 comprises steam generator tubes and a surrounding volume (or "shell") containing the tubes, thus providing two proximate flow paths (i.e., a flow path inside the tubes and a flow path outside the tubes) that are in thermal communication with each other but that are in fluid isolation from each other. In some embodiments, the primary coolant flows downward through the steam generator tubes (that is, "tube-side") while the secondary coolant flows upward through the surrounding volume (that is, "shell-side"). In other embodiments, the primary coolant flows downward through the surrounding volume (shell-side) while the secondary coolant flows upward through the steam generator tubes (tube-side). In either configuration, the steam generator tubes can have various geometries, such as vertical straight tubes (sometimes referred to as a straight-tube once-through steam generator or "OTSG"), helical tubes encircling the central riser 20 (some embodiments of which are described, by way of illustrative example, in Thome et al., "Integral Helical Coil Pressurized Water Nuclear Reactor", U.S. Pub. No. 2010/0316181 A1 published Dec. 16, 2010 which is incorporated herein by reference in its entirety), or so forth. The steam generator 24 can include various additional features such as an integral economizer.

The pressure vessel 12 defines a sealed volume that, when the PWR is operational, contains primary coolant water in a subcooled state. Toward this end, the PWR includes an internal pressurizer volume 36 disposed at the top of the pressure vessel 12. During PWR operation, the pressurizer volume 36 contains a steam bubble whose pressure controls the pressure of the primary coolant water in the operational PWR volume of the pressure vessel 12 (that is, the volume below the pressurizer volume 36). The pressure is controlled by suitable devices such as resistive heaters that heat the water to produce steam to increase pressure, and/or spargers that inject cool water into the steam bubble to reduce pressure. By way of illustrative example, in some embodiments the primary coolant pressure in the sealed volume of the pressure vessel 12 is at a pressure of about 2000 psia and at a temperature of about 300° C. (cold leg just prior to flowing into the reactor core 14) to 320° C. (hot leg just after discharge from the reactor core 14). These are merely illustrative subcooled conditions, and a diverse range of other operating pressures and temperatures are also contemplated. Although an internal pressurizer 36 is illustrated, it is alternatively contemplated to employ an external pressurizer that is connected with the upper portion of the pressure vessel via suitable piping.

Figure 2:
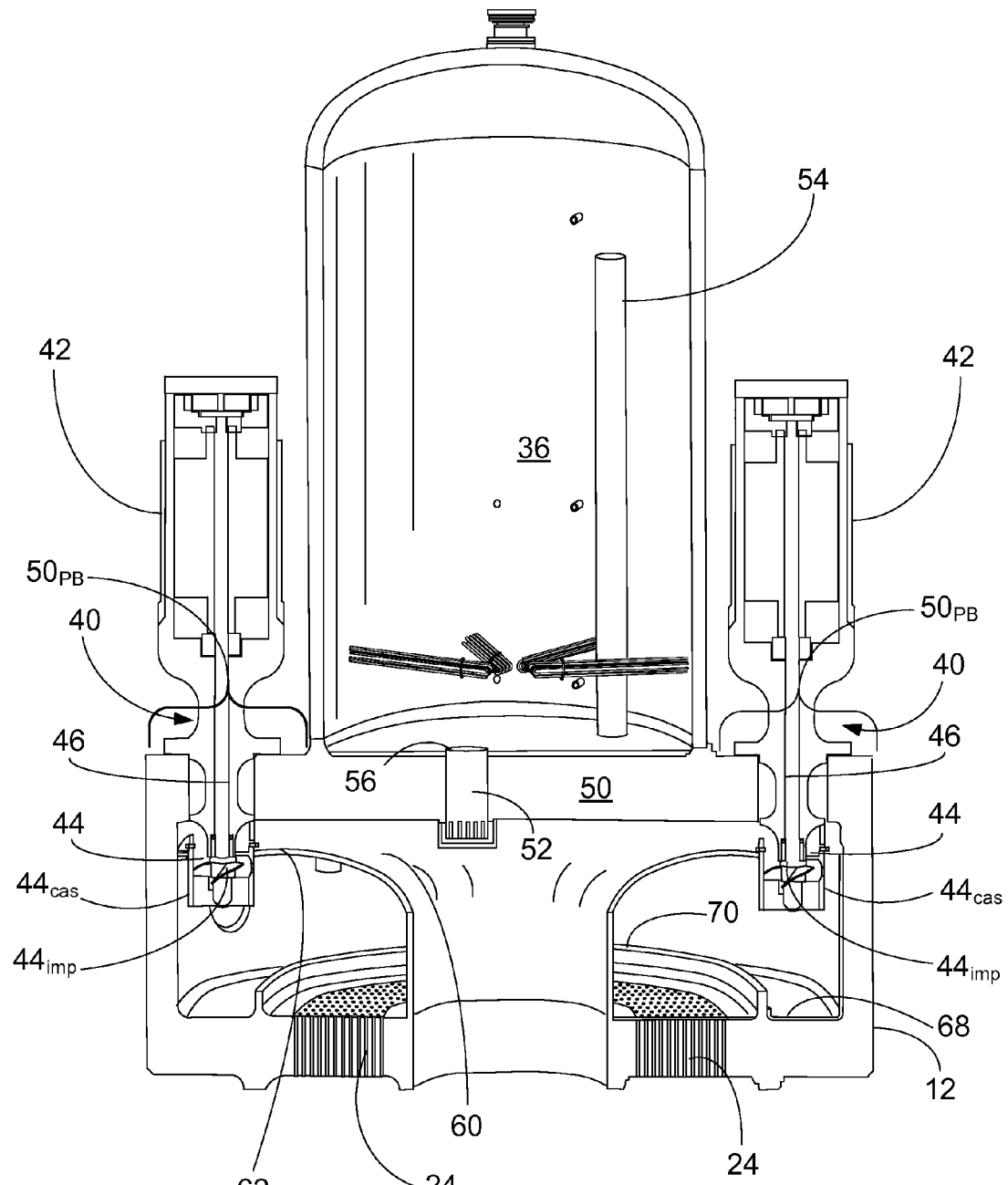
FIGS. 2 and 3 diagrammatically show perspective sectional and side sectional views of the upper portion of the nuclear reactor of FIG. 1.
Figure 3:
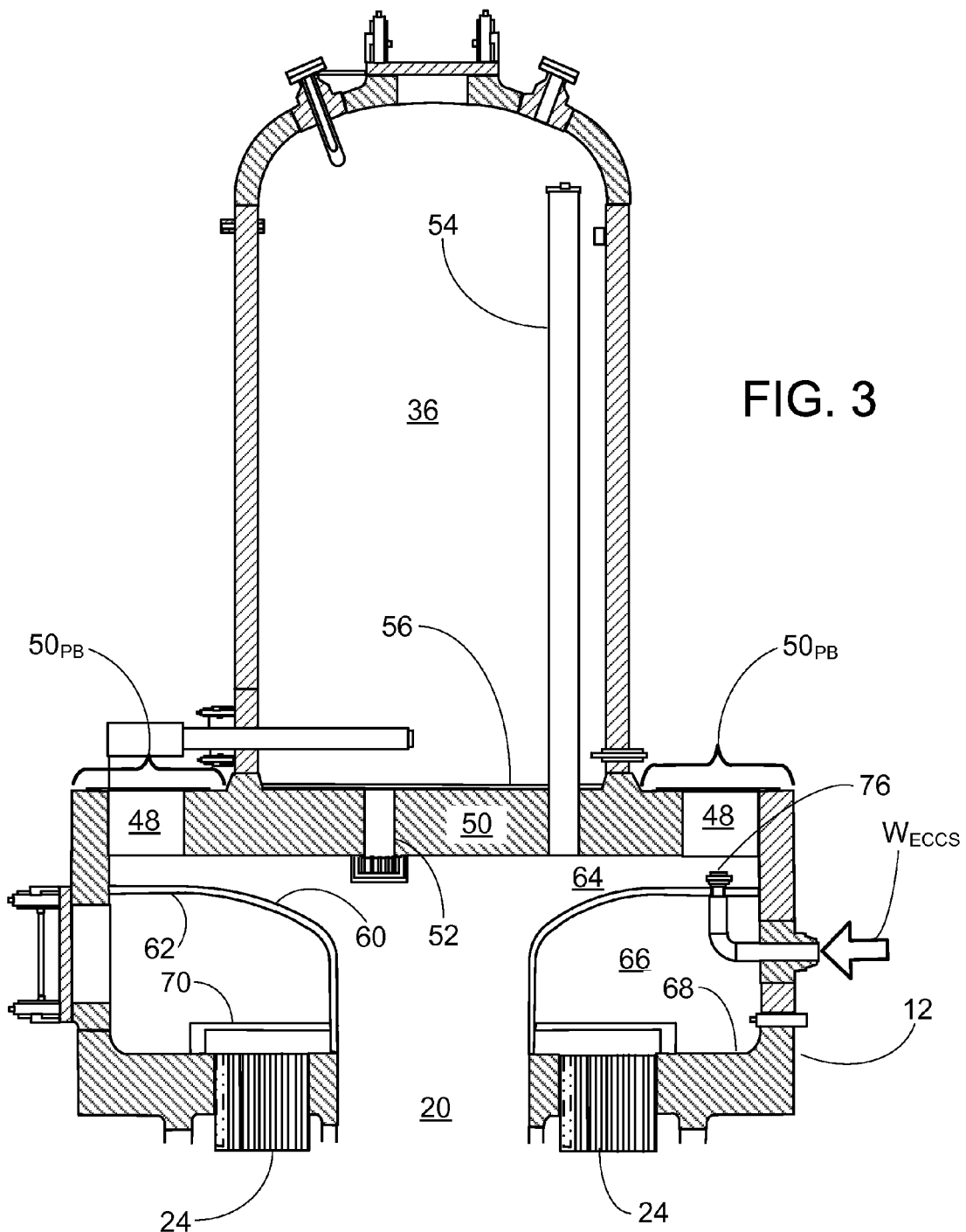

With continuing reference to FIG. 1 and with further reference to FIGS. 2 and 3, the pressurizer volume 36 is separated from the operational PWR volume by a suitable baffle structure that restricts, but does not completely block, fluid communication between the pressurizer volume 36 and the operational PWR volume. Moreover, in the illustrative embodiment the primary coolant flow is driven by reactor coolant pumps (RCPs) 40 disposed proximate to the pressurizer volume 36. These RCPs 40 are relatively heavy, as each RCP 40 includes a pump motor 42 that rotationally drives an impeller of an impeller/pump casing assembly 44. The illustrative RCPs are shown in some detail in FIG. 2, where the leftmost RCP 40 is shown in side sectional view to reveal internal components such as the impeller $44_{imp}$ located inside the pump casing $44_{cas}$, and a driveshaft 46 connecting the pump motor 42 to the impeller $44_{imp}$. The illustrative RCPs 40 are of a type conventionally used with boiling water reactor (BWR) systems, and have the impeller/casing assembly 44 submerged and an externally located pump motor 42 whose internals may be "dry", that is, isolated from the primary coolant inside the pressure vessel, or "wet", that is, immersed or at least exposed to primary coolant from inside the pressure vessel. The pump motors 42 may also have a hybrid design, such as a wet rotor and a dry stator. In the case of a dry rotor, the driveshaft 46 passes through a bearing or other sealed vessel penetration. To provide circumferentially uniform pumping there are typically a number of RCPs 40 e.g., eight RCPs 40, although fewer or more pumps are also contemplated. The RCPs 40 are spaced apart at uniform angular intervals around the cylinder axis of the cylindrical pressure vessel 12. The illustrative RCPs 40 are designed as preassembled units and are installed at openings 48 sized to admit the impeller/casing assembly 44 (see FIG. 3). Alternatively, the openings can be made smaller, e.g. sized to admit only the driveshaft, and installation is performed in multiple steps, as further described in Shargots, co-pending U.S. application Ser. No. 13/109,120 filed May 17, 2011, which is incorporated herein by reference in its entirety.

As a consequence of the foregoing, the RCPs 40 are of substantial total weight. This weight is borne by the pressure vessel 12, and in particular by the portion of the pressure vessel in which the openings 48 are defined must further enable a suitable pressure boundary. In some embodiments suitable pressure bearing capacity is provided by forming the pressure vessel to include a suitably thick horizontal ledge into which the openings are formed for mounting the RCPs. However, it is estimated that the requisite ledge thickness would be substantial. In the illustrative embodiment, suitable pressure bearing capacity is provided by employing a pump support plate 50 that spans the inner diameter of the cylindrical pressure vessel 12. A portion $50_{PB}$ of the pump support plate 50 forms a portion of the pressure boundary of the cylindrical pressure vessel 12, and the openings 48 are formed in the pressure boundary-defining portion $50_{PB}$ of the pump support plate 50. Because the pump support plate 50 is a plate and is horizontal (that is, oriented transverse to the cylinder axis of the cylindrical pressure vessel 12), the pressure boundary-defining portion $50_{PB}$ forms a horizontal ledge suitable for mounting the RCPs 40 in a vertical orientation (that is, with their drive-shafts 46 oriented parallel with the cylinder axis of the cylindrical pressure vessel 12).

To provide sufficient pressure bearing capacity, the pump support plate 50 is preferably a single-piece forged plate, such as a forged carbon steel plate. The thickness of the pump support plate 50 is designed based on the requisite pressure bearing capacity; however, the thickness is substantially less than would be required for an annular pump support ledge because the geometry spanning the inner diameter of the cylindrical pressure vessel 12 (so that there is no central opening in the pump support plate 50) enhances weight-bearing capacity as compared with an annular ledge that has a large central opening.

The pump support plate 50 also serves to separate the internal pressurizer volume 36 from the operational PWR volume of the pressure vessel 12 (that is, the volume below the pressurizer volume 36). However, to operate as a pressurizer there must be some fluid communication, albeit constricted, between the internal pressurizer volume 36 from the operational PWR volume. Toward this end, one or more surge lines 52 and one or more vent pipes 54 pass through the pump support plate 50. The surge line 52 provides constricted fluid communication during normal PWR operation in order to equalize the pressure in the operational PWR volume to the (controlled) pressure in the pressurizer volume 36. The lower end of the surge line 52 optionally includes a closing plate and side perforations or holes such that fluid communication through that end is via the perforations or holes in the sides of the lower end. Other configurations such as a coaxial surge line can additionally or alternatively be used to baffle or diffuse flow through the surge line 52. The vent pipes 54 accommodate an accident scenario in which pressure builds up in the pressure vessel 12. The vent pipes 54 provide a larger fluid pathway for relieving pressure. However, it is not desired for the vent pipes 54 to conduct fluid (and hence promote convective heat transfer) during normal operation of the PWR. Hence, the vent pipes 54 extend far enough upward into the pressurizer volume 36 so that their top ends are in the steam bubble during normal PWR operation. The openings 52, 54 do adversely impact the pressure bearing capacity of the pump support plate 50. However, since these openings 52, 54 are small (so as to constrict the fluid communication across the support plate 50) their impact on pressure bearing capacity is limited. Moreover, in some embodiments the surge line 52 is not located in the center of the pump support plate 50. Off-center positioning of the surge line 52 (and of the vent pipes 54) is expected to enhance structural strength of the pump support plate 50 versus a centrally located surge line.

It is also advantageous to have good thermal separation between the pressurizer volume 36 and the operational PWR volume. Thermal separation facilitates precise control of the pressure and temperature in the pressurizer volume 36, and limits the loss of heat to the operational PWR volume. The pump support plate 50 is typically made of steel or some other metal having relatively high thermal conductivity, and hence may not provide sufficient thermal isolation. Accordingly, in some embodiments a thermal insulator plate 56 is disposed above the pump support plate 50. The thermal insulator plate provides a larger thermal barrier between the internal pressurizer volume 36 and the operational PWR volume than is provided by the pump support plate 50. In some embodiments the thermal insulator plate 56 is spaced apart from the pump support plate 50. In this case, the gap between the thermal insulator plate 56 and the pump support plate 50 comprises a portion of the thermal barrier provided by the thermal insulation plate 56. In some embodiments the gap between the thermal insulator plate 56 and the pump support plate 50 is filled with stagnant primary coolant water. This can be achieved simply by having openings providing fluid communication into the gap, since the pump support plate 50 and the thermal insulator plate 56 are both immersed in primary coolant water during normal PWR operation. In one approach, there is a small gap between the thermal insulator plate 56 and the top of the pump support plate 50. This gap is filled with primary coolant water through small communication holes in the thermal insulator plate 56. The water that is thus temporarily trapped in the gap is stagnant water having thermal insulation properties suitable to provide a thermal barrier between the pressurizer volume 36 and the operational PWR volume. Alternatively, it is contemplated to fill the gap between the thermal insulator plate 56 and the top of the pump support plate 50 with air or another insulating fluid (in which case the gap must be hermetically sealed), or to fill the gap with an insulating solid material that is robust in the PWR environment.

The thermal insulator plate 56 generally spans the inner diameter of the cylindrical pressure vessel 12, although it is contemplated to have a small gap between the outer periphery of the thermal insulator plate and the pressure vessel wall. Such a gap could serve as an ingress point for stagnant water to enter the gap between the thermal insulator plate 56 and the top of the pump support plate 50. The thermal insulator plate 56 is not a weight-bearing structural component, and does not form any portion of the pressure boundary of the cylindrical pressure vessel 12. Accordingly, the thermal insulator plate 56 can be made of any material with suitable thermal characteristics that is robust in the PWR environment. In some embodiments the thermal insulator plate 56 is a stainless steel sheet (for example a quarter-inch thick stainless steel disk spaced apart from the pump support plate 50 by standoffs).

With continuing reference to FIGS. 2 and 3, the flow resistance experienced by the primary coolant water flowing upward out of the central riser 20, reversing direction and flowing downward into the annular steam generator 24 is reduced by suitable shaping of the upper orifice of the central riser 20. In the illustrative embodiment, the hollow cylindrical central riser 20 has a radially expanding upper orifice 60 that merges into an annular divider plate 62 that separates an upper plenum 64 above the annular divider plate 62 from a lower plenum 66 below the annular divider plate 62. The illustrative radially expanding upper orifice 60 smoothly radially expands to smoothly merge into the annular divider plate. However, it is to be understood that the smooth radial expansion may in some embodiments be implemented using a series of stepwise radial expansions that approximate the illustrated smooth radial expansion. The outer perimeter of the illustrative annular divider plate 62 seals against the inner wall of the pressure vessel 12 to provide fluid isolation between the upper and lower plenums 64, 66 at that annular juncture. The annular divider plate 62 includes openings located radially outboard of the downcomer annulus (and hence radially outboard of the annular steam generator 24). These openings provide fluid communication between the upper plenum 64 and the lower plenum 66. In the illustrative embodiment the impeller/pump casing assembly 44 of a corresponding one of the RCPs 40 fills each such opening, so that the RCP 40 pumps primary coolant from the upper plenum 64 into the lower plenum 66.

In the illustrative example, the upper plenum 64 is defined by the surface of the radially expanding upper riser orifice 60 and the top of the annular divider plate 62 and by the bottom surface of the pump support plate 50, and by a portion of the inner wall of the pressure vessel 12. In embodiments in which the pump support plate 50 is omitted, the top of the upper plenum 64 is defined by another surface such as a thermal insulator plate 56' of the internal pressurizer (see FIG. 9 for an example) or by an upper wall of the pressure vessel in embodiments employing an external pressurizer.

The lower plenum 66 is defined by the "bottom" or "backside" of the radially expanding upper orifice 60 and by the bottom of the annular divider plate 62 and by an outer surface of the central riser 20 and an inner wall of pressure vessel 12. The bottom of the lower plenum 66 is bounded by a "bottom wall" 68 formed by the inner wall of a ledge of the pressure vessel 20. The bottom wall 68 extends radially outboard from an upper end of the downcomer annulus (or, equivalently in the illustrative embodiment, bottom wall 68 extends radially outboard from an upper end of the annular steam generator 24).

In general, flow analysis found that this design with the radially expanding upper orifice 60 merging into the annular divider plate 62 separating the upper and lower plenums 64, 66 significantly reduced the pressure drop and flow turbulence in this region as compared with numerous designs such as those shown in U.S. Pub. No. 2010/0316181 A1 that employs an abrupt 90° transition. It was found that this design in combination with placement of the openings through which primary coolant flows from the upper plenum 64 to the lower plenum 66 at locations outboard from the downcomer annulus promotes both radial and circumferential flow uniformity of primary coolant into the upper end of the downcomer annulus. (Said another way, this design in combination with placement of the RCPs 40 at locations outboard from the annular steam generator 24 promotes both radial and circumferential flow uniformity of primary coolant into the upper end of the annular steam generator 24).

However, an undesirable phenomenon was also observed with this arrangement. Flow analyses showed that a portion of the flow would impinge upon the bottom wall 68 that extends radially outboard from the upper end of the annular steam generator 24, and then jet across the tube bundle at the upper end of the steam generator 24 rather than flowing uniformly downward into the tube bundle. It was found that addition of a flow diffuser disposed in the lower plenum 66 to diffuse primary coolant flow from the RCPs 40 into the downcomer annulus substantially reduced this flow jetting effect. However, a large flow diffuser could add undesirable flow resistance. It was found that a flow diffuser in the form of a low-profile annular weir 70 extending away from the bottom wall 68 of the lower plenum 66 provided the desired suppression of the jetting effect without a large concomitant increase in flow resistance. The annular weir 70 is outboard of the annular steam generator 24 but inboard of the RCPs 40.

Figure 4:
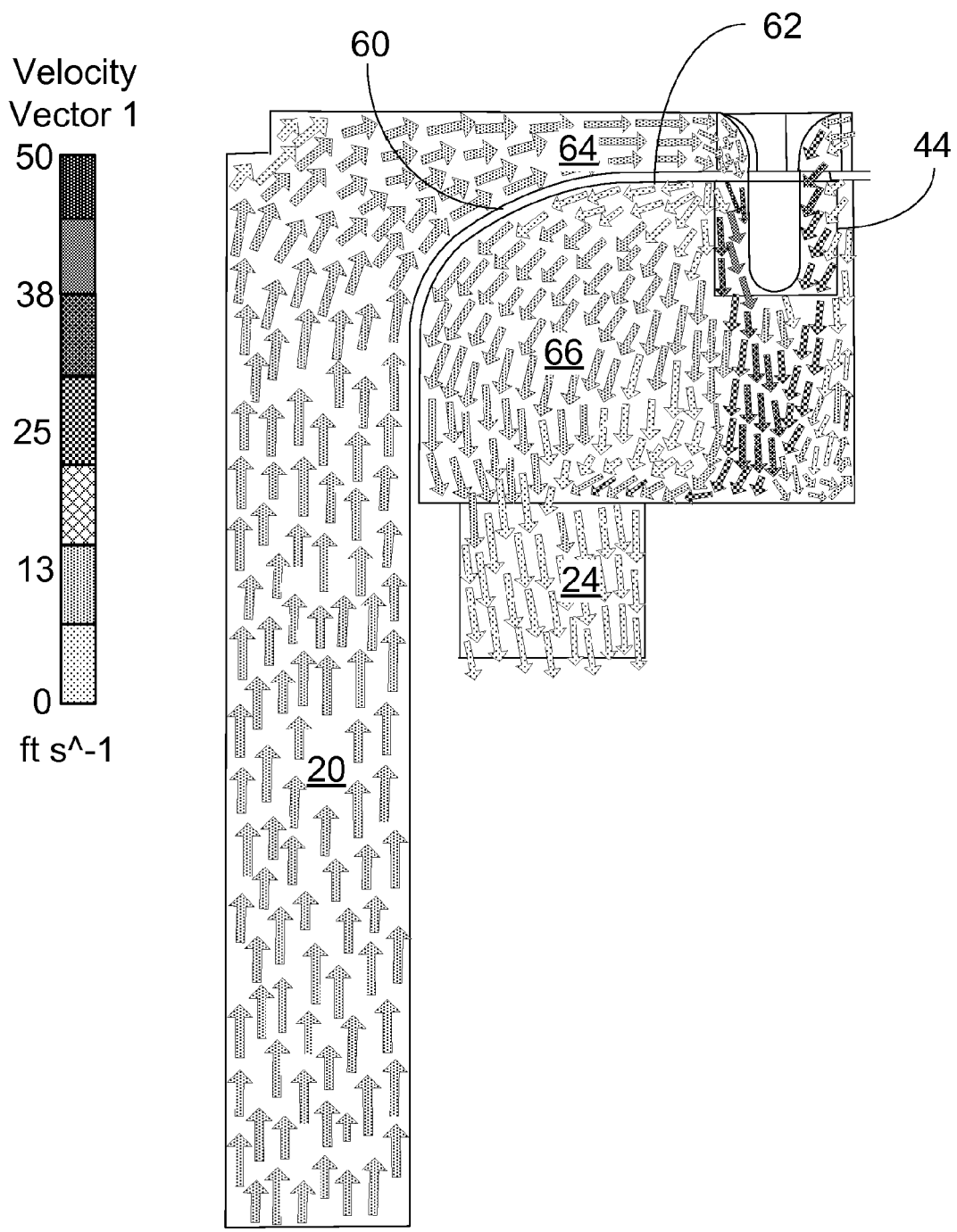
FIGS. 4 and 5 show computed primary coolant water flow patterns for the upper portion of FIGS. 2 and 3 without the weir.
Figure 5:
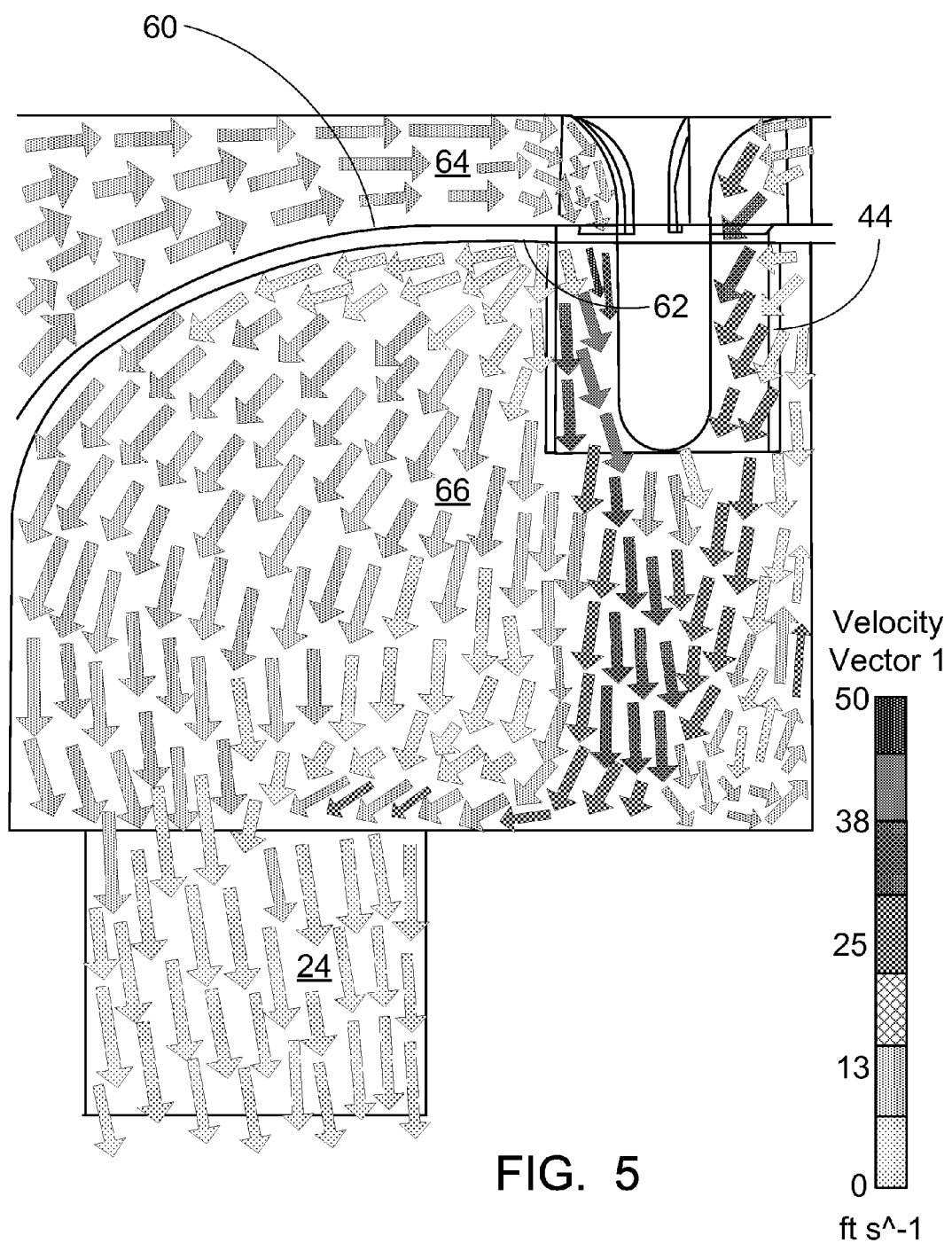
Figure 6:
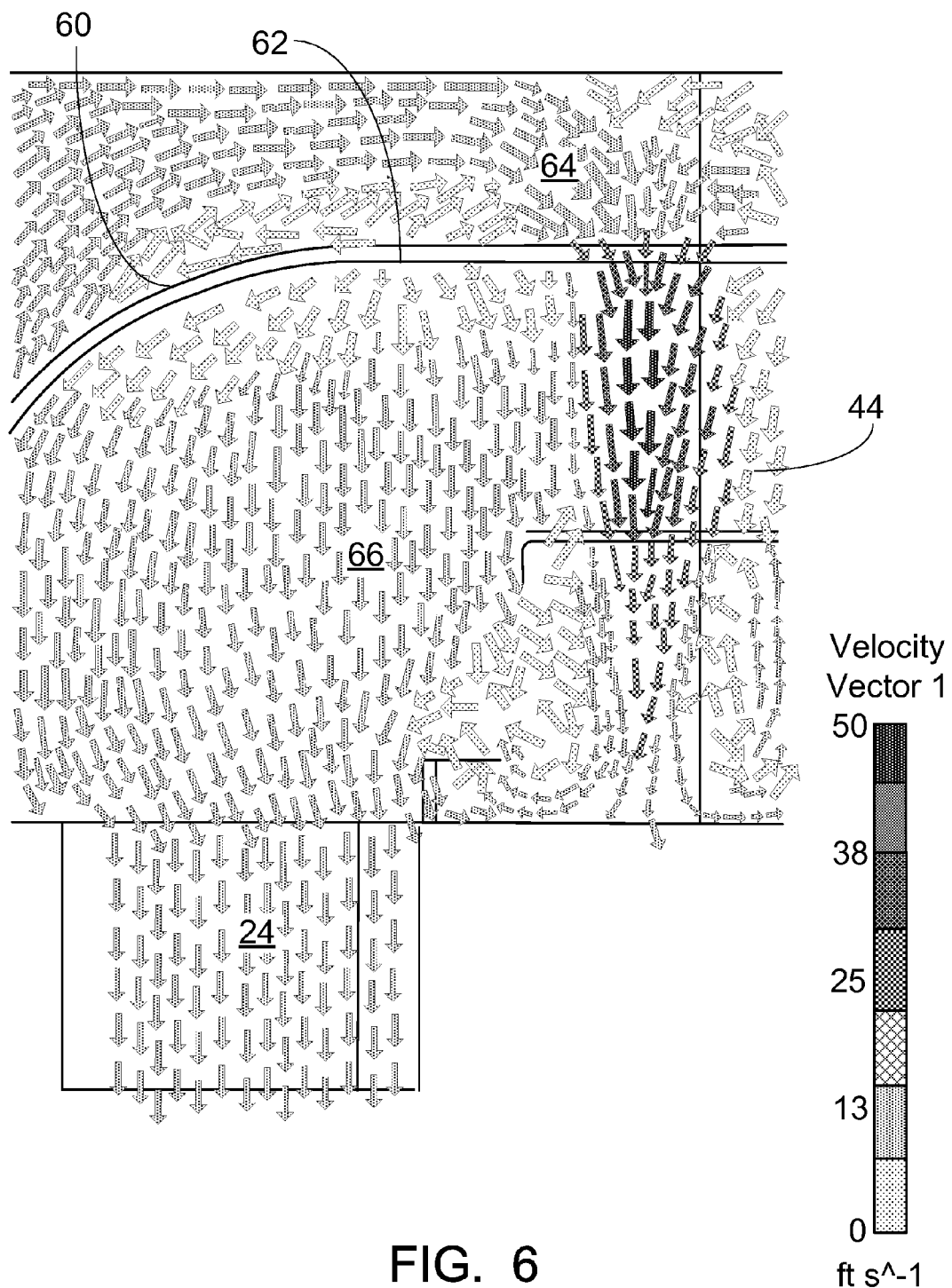
FIG. 6 shows computed primary coolant water flow patterns for the upper portion of FIGS. 2 and 3 with the weir.

With reference to FIGS. 4-6, flow patterns are shown illustrating these effects. FIGS. 4 and 5 show flow paths calculated for a design that does not include the weir 70. The fluid stays close to the curvature of the radially expanding upper riser orifice 60, and low flow turbulence is observed on the inlet side of the RCP 40. However, flow on the outboard portion of the top of the annular steam generator 24 is partially flowing laterally, giving non-uniform flow into the steam generator 24. As a consequence, the flow through the inboard tubes of the steam generator (or through the inboard portion of the shell in the case of a steam generator with shell-side primary coolant flow) will be substantially higher than flow through the outboard tubes of the steam generator (or through the outboard portion of the shell in the case of a steam generator with shell-side primary coolant flow). As seen in FIG. 6, the addition of the weir 70 substantially reduces this radial nonuniformity. The weir 70 diffuses the flow precisely in the region of the jetting, so as to almost completely eliminate the jetting effect while adding only a small additional flow resistance.

The precise configuration of the weir 70 is readily designed using flow simulations. In general, the weir 70 should be made as low as practicable while still providing the desired suppression of the jetting, since the flow resistance is expected to increase with increasing height of the weir 70. The illustrative weir 70 has an annular geometry with a rectangular cross-section, but other configurations are expected to be suitable. The annular geometry assists in providing circumferential uniformity; however, simulations indicate this effect is secondary to the radial effect, and in some embodiments it is contemplated to replace the illustrated continuous annular weir 70 with a discontinuous weir, for example with a weir located aligned with each RCP 40 and regions in-between that omit the weir. It is also expected that the rectangular cross-section could be replaced by a tilted structure, or a rounded structure. Rounding the weir is expected to reduce both its flow resistance and its effectiveness as a flow diffuser, so it may be possible to use a larger rounded weir with substantially similar effect to a smaller rectangular weir.

Although the illustrative smoothly radially expanding upper riser orifice 60 provides flow advantages as illustrated in FIGS. 4-6, it is also contemplated to use other configurations such as a straight vertical riser upper orifice oriented at 90° to a horizontal divider plate, optionally including openings such as are shown in U.S. Pub. No. 2010/0316181 A1. Such an arrangement can also be coupled with RCPs 40 mounted in the location shown in FIGS. 1-3, but with the impeller/pump casing assembly 44 disposed in openings of the horizontal divider plate. Such a design still includes an upper plenum and a lower plenum separated by the divider plate.

Figure 7:
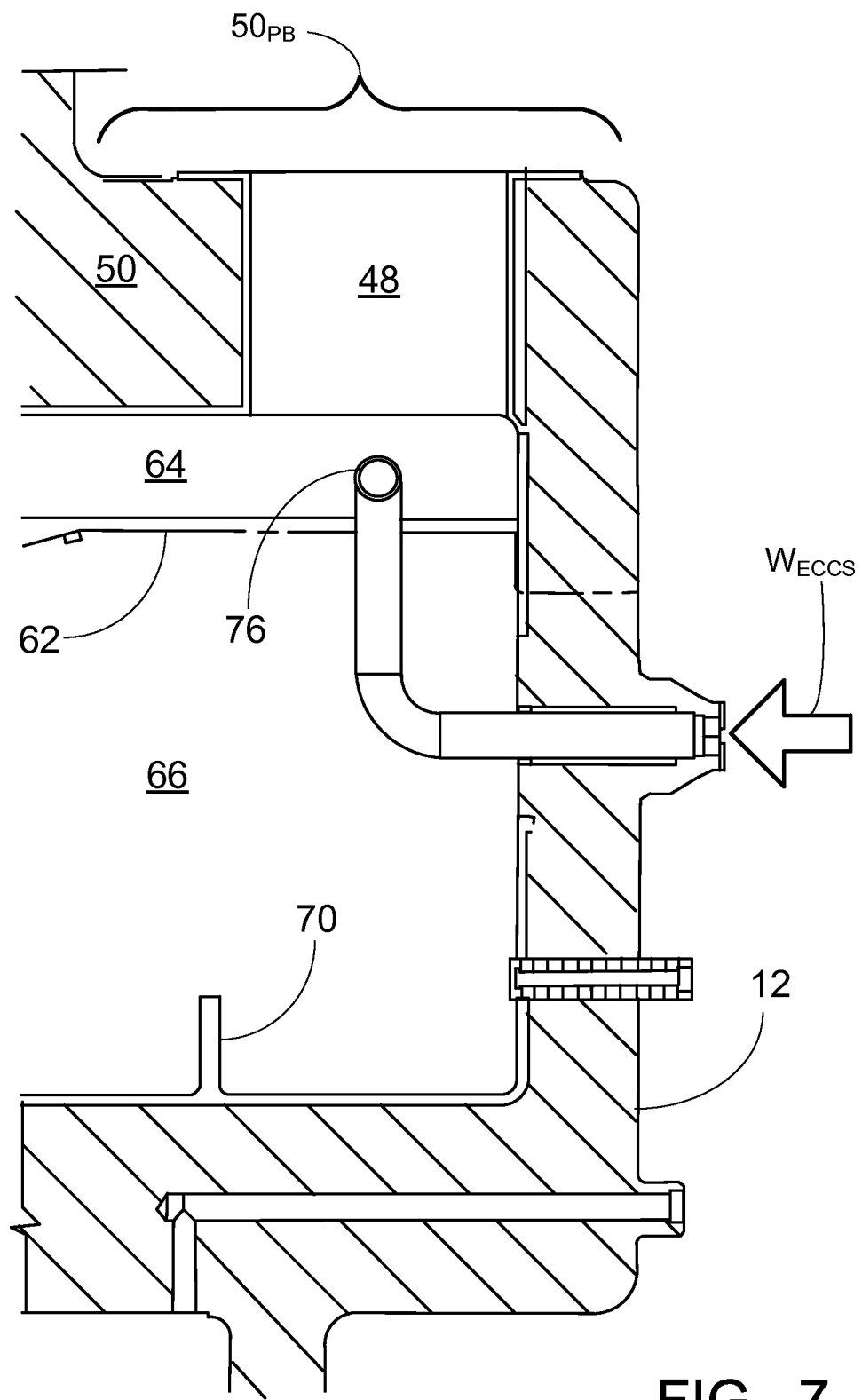
FIG. 7 shows an enlarged view of a portion of FIG. 3 focusing on the emergency core cooling system (ECCS) return line nozzle.

With reference to FIG. 3 and with further reference to FIG. 7, in any such embodiment, or in the embodiment of FIG. 3, an emergency core cooling system (ECCS) return line nozzle 76 is suitably arranged to inject water $W_{ECCS}$ into the upper plenum 64. This allows for an advantageous arrangement for ECCS injection during a transient condition. The location of the ECCS injection nozzle 76 injecting into the upper plenum 64 allows the ECCS to be injected high above the reactor core 14 (see FIG. 1). This reduces the risk of the reactor core 14 being uncovered during an accident situation. Furthermore, locating the ECCS injection nozzle 76 injecting into the upper plenum 64 places the injection point on the suction side of the RCPs 40, which allows the ECCS return line 76 to operate at lower pressure than would be needed if the injection point were located on the discharge side of the RCPs. By injecting the ECCS water on the suction side of the RCPs 40, the differential pressure across the RCPs 40 actively pumps the coolant water from the ECCS return line 76 which enhances ECCS performance (at least for accident scenarios in which the RCPs 40 are operative). The illustrative ECCS return line nozzle 76 actually penetrates the reactor pressure boundary into the lower plenum 66, and then makes a 90° bend to penetrate through the annular divider plate 62 and into the upper plenum 64 where it injects the ECCS water. Optionally, the ECCS return line nozzle 76 may branch into a tie to allow ECCS coolant to be delivered to multiple injection points proximate to two (or more) RCPs 40.

Figure 8:
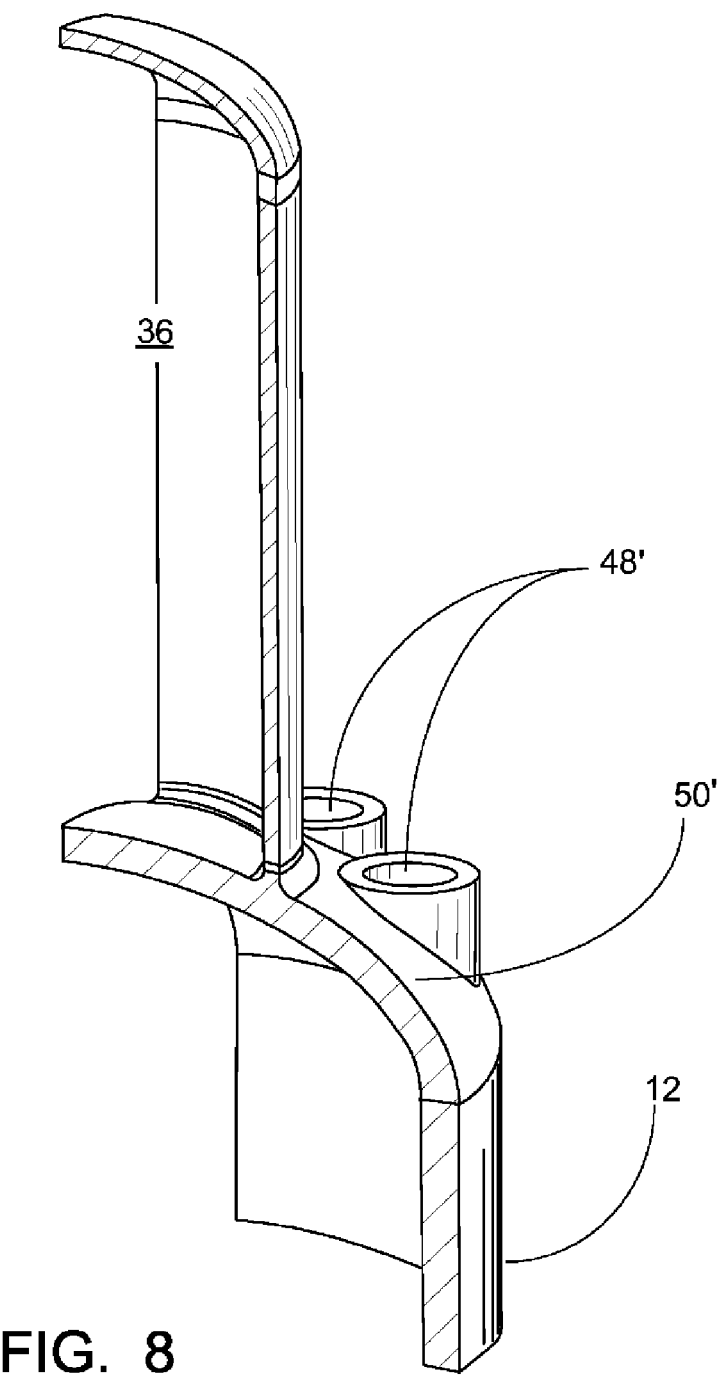
FIG. 8 shows a perspective view of a portion of an upper pressure vessel portion of an alternative embodiment that uses an arcuate annular surface to provide a pressure boundary and bases for mounting RGPs proximate to the pressurizer.

With reference to FIG. 8, another contemplated variant is to replace the pump support plate 50 of FIGS. 1-3 with an arcuate annular ledge 50' formed into the pressure vessel 12. In FIG. 8 openings 48' in the arcuate annular ledge 50' serve to mount RCPs in the same way as described for the openings 48 in the pump support plate 50 of FIGS. 1-3. In numerical simulations, it was found that designing the arcuate annular ledge 50' to conform with an elliptical head having a 2:1 ratio between the major and minor axes provided an optimal configuration for pump pressure bearing strength. A benefit of the arcuate annular ledge 50' is that the arcuate geometry enhances strength against internal pressure, which enables the use of a smaller shell thickness for the arcuate annular ledge 50' as compared with other geometries. A disadvantage of the arcuate annular ledge 50' is that it can be expensive to forge since the openings 48' are shaped to provide a desired (e.g., vertical) orientation for the RCPs, and can complicate the mounting of the RCPs. Further, the shaping of the openings 48' and the arcuate shape of the arcuate annular ledge 50' may require longer drive shafts for the RCPs.

Figure 9:
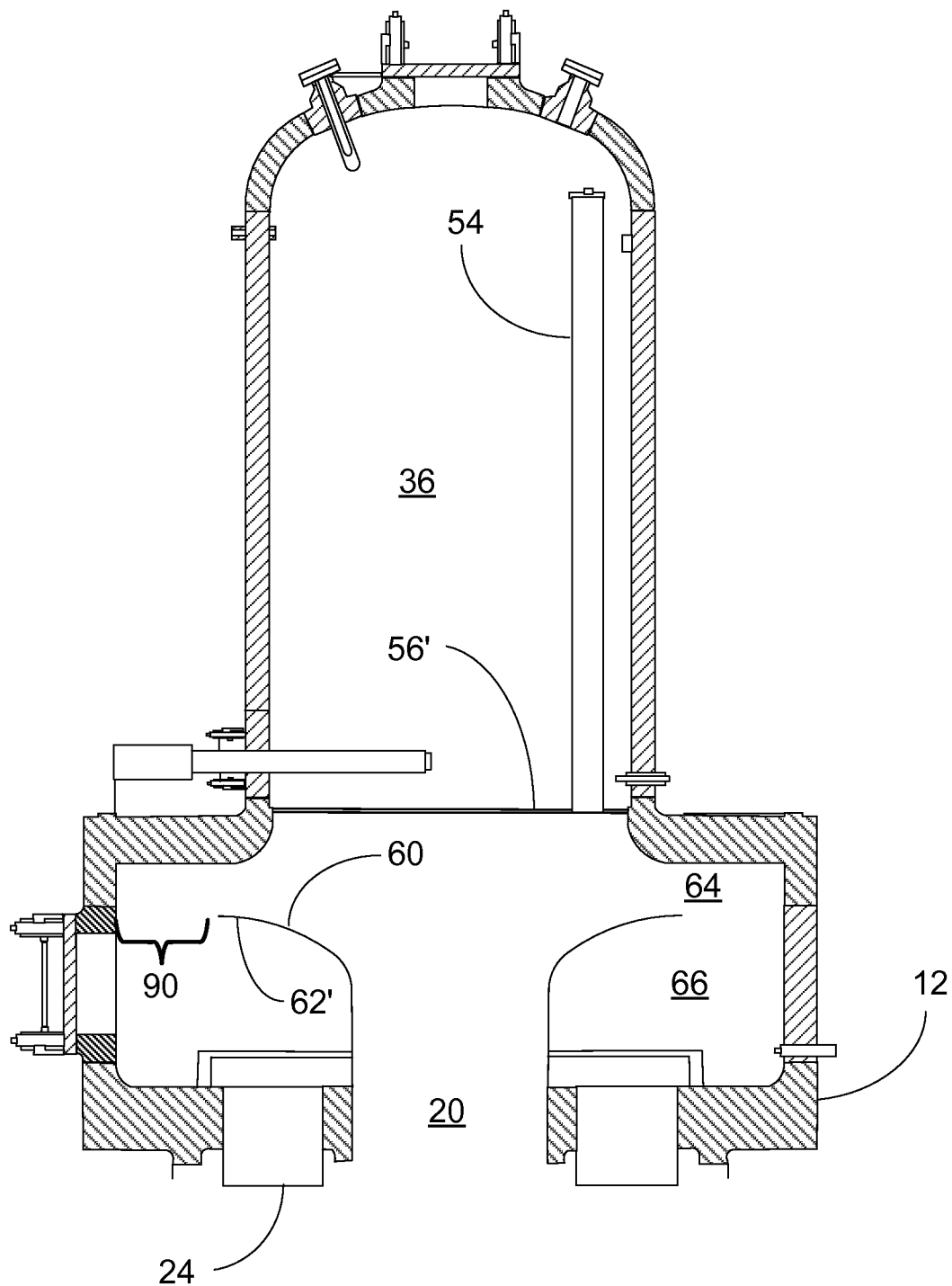
FIG. 9 shows a variant embodiment of the upper portion of FIGS. 2 and 3 which is suitable for natural circulation operation.

With reference to FIG. 9, the disclosed hollow cylindrical central riser 20 with the radially expanding upper orifice 60 merging into the annular divider plate 62 that separates the upper and lower plenums 64, 66 is also contemplated for use in other designs. FIG. 9 shows a design employing natural circulation (or, alternatively, employing RCPs located somewhere away from the pressurizer). In this embodiment the pump support plate 50 of FIGS. 1-3 is omitted since there are no RCPs to support, and a thermal insulator plate 56' is designed to provide a thermal barrier between the pressurizer volume 36 and the operational PWR volume. The thermal insulator plate 56' may, for example, comprise two spaced apart stainless steel sheets having the gap in-between filled with stagnant primary coolant water. In the embodiment of FIG. 9 the radially expanding upper orifice 60 merges into a modified annular divider plate 62' whose outer perimeter does not seal against the inner wall of the pressure vessel 12. Instead, annular gap 90 separates the outer perimeter of the annular divider plate 62' from the inner wall of the cylindrical pressure vessel 12. The annular gap 90 provides fluid communication between the upper and lower plenums 64, 66. The annular gap is radially outboard of the downcomer annulus (and hence radially outboard of the annular steam generator 24), so that the flow uniformity shown, for example, in FIGS. 4-6, is likely to be achievable with the design of FIG. 9 as well. The size of the annular gap 90 can be chosen to optimize flow characteristics such as resistance, flow uniformity in the lower plenum 66, and downward flow into the annular steam generator 24. Although not illustrated, it is also contemplated to shape the outer perimeter of the divider plate 62' to help shape the flow characteristics.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:
1. An apparatus comprising:
a pressurized water reactor (PWR) including:
   a nuclear core comprising a fissile material,
   a cylindrical pressure vessel having a vertically oriented cylinder axis and containing the nuclear core immersed in primary coolant water, and
   a hollow cylindrical central riser disposed concentrically with and inside the cylindrical pressure vessel,
   a downcomer annulus being defined between the hollow cylindrical central riser and the cylindrical pressure vessel,
wherein the hollow cylindrical central riser has a radially expanding upper orifice that extends radially outwardly from the hollow cylindrical central riser and merges into an annular divider plate that separates an upper plenum above the annular divider plate from a lower plenum below the annular divider plate and wherein the upper plenum is in fluid communication with the radially expanding upper orifice and the lower plenum is in fluid communication with the downcomer annulus.

2. The apparatus of claim 1 wherein an annular gap separates an outer perimeter of the annular divider plate from an inner wall of the cylindrical pressure vessel, the annular gap providing fluid communication between the upper and lower plenums, the annular gap being radially outboard of the downcomer annulus.

3. The apparatus of claim 1 wherein the annular divider plate forms an annular seal with an inner wall of the cylindrical pressure vessel, the annular divider plate including openings located radially outboard of the downcomer annulus providing fluid communication between the upper plenum and the lower plenum.

4. The apparatus of claim 3 further comprising:
reactor coolant pumps (RCPs) arranged at the openings in the annular divider plate to pump reactor coolant water from the upper plenum into the lower plenum.

5. The apparatus of claim 4 wherein the PWR further comprising:
a pump support plate spanning the inner diameter of the cylindrical pressure vessel and forming a portion of the pressure boundary of the cylindrical pressure vessel, the RCPs being supported by the pump support plate.

6. The apparatus of claim 5 wherein the pump support plate comprises a single-piece forged plate.

7. The apparatus of claim 3 further comprising:
a steam generator disposed in the downcomer annulus, wherein downward primary coolant flow from the lower plenum through the steam generator heats upward secondary coolant flow through the steam generator that is in fluid isolation from the downward primary coolant flow.

8. The apparatus of claim 7 wherein the PWR further comprising:
a pump support plate spanning the inner diameter of the cylindrical pressure vessel and forming a portion of the pressure boundary of the cylindrical pressure vessel, a plurality of RCPs being supported by the pump support plate.

9. The apparatus of claim 8 wherein:
an upper portion of the cylindrical pressure vessel defines an internal pressurizer volume,
the pump support plate separates the internal pressurizer volume from an operational PWR volume of the pressure vessel that includes at least the upper and lower plenums, the downcomer annulus, and the volume contained by the hollow cylindrical central riser, and the pump support plate includes a surge line passing through the pump support plate.

10. The apparatus of claim 9 wherein the surge line is not located in the center of the pump support plate.

11. The apparatus of claim 9 wherein the PWR further comprises:
a thermal insulator plate disposed above and spaced apart from the pump support plate.

12. The apparatus of claim 9 wherein the PWR further comprises:
a flow diffuser disposed in the lower plenum to diffuse primary coolant flow from openings in the annular divider plate into the downcomer annulus.

13. The apparatus of claim 12 wherein the lower plenum is defined in part by a bottom wall that extends radially outboard from an upper end of the downcomer annulus, and the flow diffuser comprises:
a weir extending away from the bottom wall of the lower plenum.

14. The apparatus of claim 13 further comprising:
an emergency core cooling system return line nozzle arranged to inject water into the upper plenum.

15. The apparatus of claim 1 wherein the PWR further comprises:
a flow diffuser disposed in the lower plenum to diffuse primary coolant flow from openings in the annular divider plate into the downcomer annulus.

16. The apparatus of claim 15 wherein the lower plenum is defined in part by a bottom wall that extends radially outboard from an upper end of the downcomer annulus, and the flow diffuser comprises:
a weir extending away from the bottom wall of the lower plenum.

17. The apparatus of claim 16 wherein the weir comprises an annular weir surrounding the upper end of the downcomer annulus.

18. The apparatus of claim 15 further comprising:
an emergency core cooling system return line nozzle arranged to inject water into the upper plenum.

19. An apparatus comprising:
a pressurized water reactor (PWR) including:
a nuclear core comprising a fissile material,
a cylindrical pressure vessel having a vertically oriented cylinder axis and containing the nuclear core immersed in primary coolant water,
a hollow cylindrical central riser disposed concentrically with and inside the cylindrical pressure vessel, a downcomer annulus being defined between the hollow cylindrical central riser and the cylindrical pressure vessel, and an annular divider plate separating an upper plenum above the annular divider plate from a lower plenum below the annular divider plate;
wherein the upper plenum is in fluid communication with an upper orifice of the hollow cylindrical riser and the lower plenum is in fluid communication with the downcomer annulus; and
wherein a flow path from the upper plenum to the lower plenum is disposed outboard of the downcomer annulus,
the upper orifice of the hollow cylindrical central riser extends radially outwardly therefrom and merges into the annular divider plate.

20. The apparatus of claim 19 wherein a weir extends away from a bottom wall of the lower plenum into the lower plenum and the weir is radially outboard of the downcomer annulus and
the weir is radially inboard of the flow path from the upper plenum to the lower plenum.

21. The apparatus of claim 20 wherein the weir comprises an annular weir.

22. The apparatus of claim 20 wherein the apparatus further comprises:
reactor coolant pumps (RCPs) arranged to pump primary coolant from the upper plenum into the lower plenum through the flow path from the upper plenum to the lower plenum that is disposed outboard of the downcomer annulus.

23. The apparatus of claim 22 wherein the PWR further comprises:
a pump support plate spanning the inner diameter of the cylindrical pressure vessel and forming a portion of the pressure boundary of the cylindrical pressure vessel, the RCPs being supported by the pump support plate.

24. The apparatus of claim 23 wherein:
an upper portion of the cylindrical pressure vessel defines an internal pressurizer volume,
the pump support plate separates the internal pressurizer volume from an operational PWR volume of the pressure vessel that includes at least the upper and lower plenums, the downcomer annulus, and the volume contained by the hollow cylindrical central riser, and
the pump support plate includes a surge line passing through the pump support plate.

25. The apparatus of claim 24 wherein the surge line is not located in the center of the pump support plate.

26. The apparatus of claim 24 further comprising:
a thermal insulator plate disposed above the pump support plate.

27. The apparatus of claim 26 further comprising:
an emergency core cooling system return line nozzle arranged to inject water into the upper plenum.

28. An apparatus comprising:
a pressurized water reactor (PWR) including:
a nuclear core comprising a fissile material,
a cylindrical pressure vessel having a vertically oriented cylinder axis and containing the nuclear core immersed in primary coolant water,
a hollow cylindrical central riser disposed concentrically with and inside the cylindrical pressure vessel, a downcomer annulus being defined between the hollow cylindrical central riser and the cylindrical pressure vessel, and
a pump support plate spanning the inner diameter of a top portion of the cylindrical pressure vessel above the hollow cylindrical central riser, wherein a portion of the pump support plate forms a portion of the pressure boundary of the cylindrical pressure vessel; and
reactor coolant pumps (RCPs) supported by the portion of the pump support plate that forms a portion of the pressure boundary of the cylindrical pressure vessel, the RCPs being arranged to pump primary coolant water discharged from an upper orifice of the hollow cylindrical central riser downwardly into the downcomer annulus.

29. The apparatus of claim 28 wherein the pump support plate comprises a single-piece forged plate.

30. The apparatus of claim 29 wherein:
an upper portion of the cylindrical pressure vessel defines an internal pressurizer volume,
the pump support plate separates the internal pressurizer volume from an operation al PWR volume of the pressure vessel that includes at least the upper and lower plenums, the downcomer annulus, and the volume contained by the hollow cylindrical central riser, and the pump support plate includes a surge line passing through the pump support plate.

31. The apparatus of claim 30 wherein the surge line is not located in the center of the pump support plate.

32. The apparatus of claim 30 further comprising:

a thermal insulator plate disposed above the pump support plate, the thermal insulator plate providing a larger thermal barrier between the internal pressurizer volume and the operational PWR volume than is provided by the pump support plate.

33. The apparatus of claim 32 wherein the thermal insulator plate is spaced apart from the pump support plate and a gap between the thermal insulator plate and the pump support plate comprises a portion of the thermal barrier provided by the thermal insulator plate.

34. The apparatus of claim 33 wherein the gap between the thermal insulator plate and the pump support plate contains stagnant primary coolant water.

35. An apparatus comprising:

a pressurized water reactor (PWR) including:

a nuclear core comprising a fissile material, a cylindrical pressure vessel having a vertically oriented cylinder axis and containing the nuclear core immersed in primary coolant water, a hollow cylindrical central riser including a radially expanding upper orifice and being disposed concentrically with and inside the cylindrical pressure vessel, a downcomer annulus being defined between the hollow cylindrical central riser and the cylindrical pressure vessel, and an annular divider plate separating an upper plenum above the annular divider plate from a lower plenum below the annular divider plate the radially expanding upper orifice extending radially outwardly from the hollow cylindrical central riser and merging into the annular divider plate; and an emergency core cooling system return line nozzle arranged to inject water into the upper plenum.

\* \* \* \* \*